(12) United States Patent
Oba et al.

(10) Patent No.: US 6,441,828 B1
(45) Date of Patent: Aug. 27, 2002

(54) IMAGE DISPLAY APPARATUS

(75) Inventors: Haruo Oba; Kunihito Sawai, both of Kanagawa; Yoshiaki Inoue; Iwami Tsujimura, both of Aichi, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/391,941

(22) Filed: Sep. 8, 1999

(30) Foreign Application Priority Data

Sep. 8, 1998 (JP) .......................................... 10-254231
Jan. 25, 1999 (JP) .......................................... 11-016215

(51) Int. Cl.$^7$ ................................................ G09G 5/34
(52) U.S. Cl. ........................ 345/659; 345/905; 348/794
(58) Field of Search ........................... 345/10, 126, 1–2, 345/905, 326–327, 329, 330; 361/681, 683, 686–687; 348/333.01, 333.02, 333.03, 333.04, 333.11, 333.12, 232, 222, 207, 211, 552, 794, 373, 14.09; 725/109, 112–113, 118, 133, 141; 382/103; 709/204

(56) References Cited

U.S. PATENT DOCUMENTS

| | | | | |
|---|---|---|---|---|
| 5,745,160 A | * | 4/1998 | Ishida et al. ............. | 348/14.09 |
| 5,867,654 A | * | 2/1999 | Ludwig et al. ............. | 709/204 |
| 5,900,909 A | * | 5/1999 | Parulski et al. ............. | 348/232 |
| 5,963,250 A | * | 10/1999 | Parker et al. ................ | 348/211 |
| 5,970,162 A | * | 10/1999 | Kawashima et al. ........ | 382/103 |
| 5,986,634 A | * | 11/1999 | Alioshin et al. ............. | 345/126 |
| 6,141,052 A | * | 10/2000 | Fukumitsu et al. ......... | 348/373 |

* cited by examiner

Primary Examiner—Richard Hjerpe
Assistant Examiner—Francis Nguyen
(74) Attorney, Agent, or Firm—Jay H. Maioli

(57) ABSTRACT

In an image display apparatus, information on a direction in which an image is to be displayed on a display panel is recorded in a memory card, and a to-be-displayed image signal corresponding to the displaying-direction information read from the memory card is displayed on the display panel. The displaying-direction information relates to a direction in which the image is to be displayed on the display panel. More particularly, it is information indicative of a direction designated by the user of the apparatus pressing a rotate button on an operation panel and in which image information initially read from the memory card is displayed on the display panel. Pressing the rotate button a maximum of three times for one image will rotate the image clockwise, for example, whereby it is possible to designate a desired direction in which the image is to be displayed. Thus an image can be displayed in a correct direction even with no designation for an image's normal direction regardless of whether the image display apparatus itself is placed with the shorter or longer side down.

18 Claims, 13 Drawing Sheets

IMAGE DISPLAY APPARATUS

BACKGROUND OF THE INVENTION

1. Field of the Invention

The present invention relates to an image display apparatus to display a digital image acquired by means of a digital still camera, for example.

2. Description of Related Art

Conventionally, images photographed by a silver-film camera, electronic still camera (including digital still camera), etc. are viewed or enjoyed in various manners as will be described below.

An image photographed with a silver-film camera is viewed or enjoyed in various ways. Namely, the image is printed on a photographic paper to produce a picture. Usually, the picture is put in a photo mount or frame, for example, or filed in a album for storage and later viewing or enjoyment. Alternatively, a positive film produced based on the developed negative silver film is used in a slide projector to project the image onto a screen for enlarged viewing.

An image acquired with an electronic still camera (including a digital still camera) can be viewed, for example, by displaying it on a display apparatus connected to a personal computer or on a display screen or panel, if any, provided on the electronic still camera.

Once an image acquired with a silver-film camera is put in a photo mount or frame, no other image cannot be viewed in the mount or frame. For viewing another image in the photo mount, it is replaced with the existing one. Also, once such an image is filed in a photo album, the album has to be taken out from a storage place and many pages have to be turned to access a desired. For viewing 36 pictures, for example, so many album pages have to be turned. Namely, desired images cannot easily be accessed if they are filed in an album. When viewing an image projected on a screen from a slide projector using a positive film produced based on a negative silver film, it cannot be viewed clearly in a bright place, a projection screen is necessary, and a relatively large space has to be available for an enlarged image projection. The place should be provided with blackout curtains which would be required to view the image clearly in a day time, for example.

On the other hand, viewing an image photographed by an electronic still camera (including a digital still camera) needs no replacement of one image with any other desired one, no turning of album pages in viewing a plurality of pictures printed from a silver film and no slide projector and screen, but a display apparatus connected to a personal computer. In case the electronic still camera is a camera provided with a image playback display apparatus or display panel, however, images cannot be viewed unless the display apparatus is available. Recently, there are commercially available external recording media each having digitally recorded therein a photo collection of a celebrity. However, to view such digital images recorded on such an external recording medium, for example, a personal computer and a display apparatus connectable to the personal computer are required. No dedicated apparatus easy to operate for display of such images has yet been proposed.

SUMMARY OF THE INVENTION

Accordingly, the present invention has an object to provide an image display apparatus capable of displaying an image in a normal (erect) direction whether the apparatus is placed with the shorter or longer side down and without giving the apparatus any special command for the normal direction of the image.

The present invention has another object to provide an image display apparatus allowing an easy viewing of digital images even without any personal computer and other display apparatus and also an easy viewing of digital images supplied via an external recording medium having recorded therein a photo collection of a celebrity, and which can be designed to have a decorative feature like a photo mount or frame for a silver-film image.

The above object can be attained by providing an image display apparatus destined to display image data read from a recording medium, comprising:

means for generating image signal by processing image data from the recording medium in a predetermined manner;

means for displaying the image signal supplied from the image processing means; and a controlling means for recording into the recording medium information on a direction in which the image signal is to be displayed on the image displaying means and displaying the image signal on the image displaying means in a direction corresponding to the displaying-direction information read from the recording medium.

Also the above object can be attained by providing an image display apparatus destined to display image data read from a recording medium, comprising:

means for generating image signal for display based on image information read from the recording medium;

means for displaying the to-be-displayed image signal produced by the image signal generating means; and means for determining a direction in which the image is to be displayed on the image displaying means according to a posture in which the apparatus is placed.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
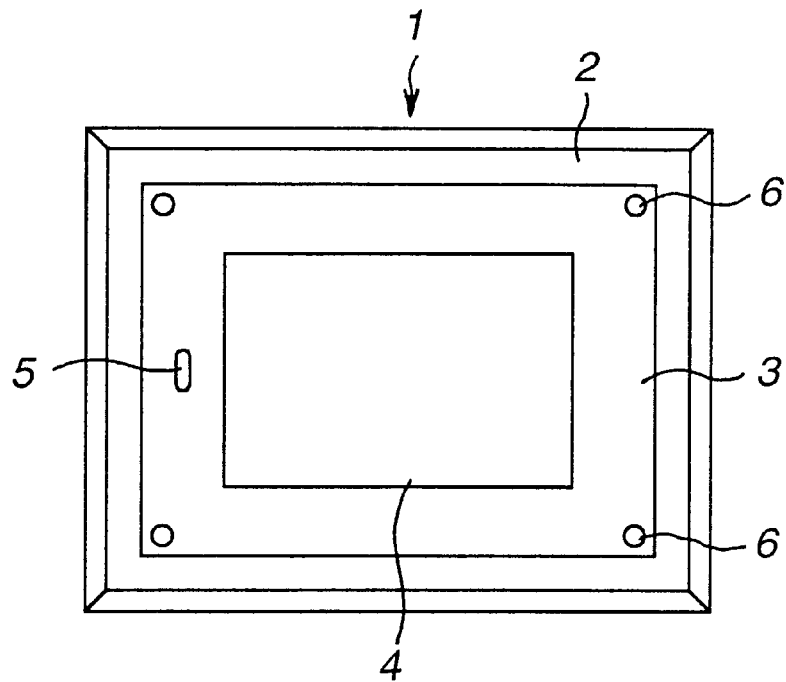
FIG. 1 is a front view of an embodiment of image display apparatus according to the present invention.
Figure 2:
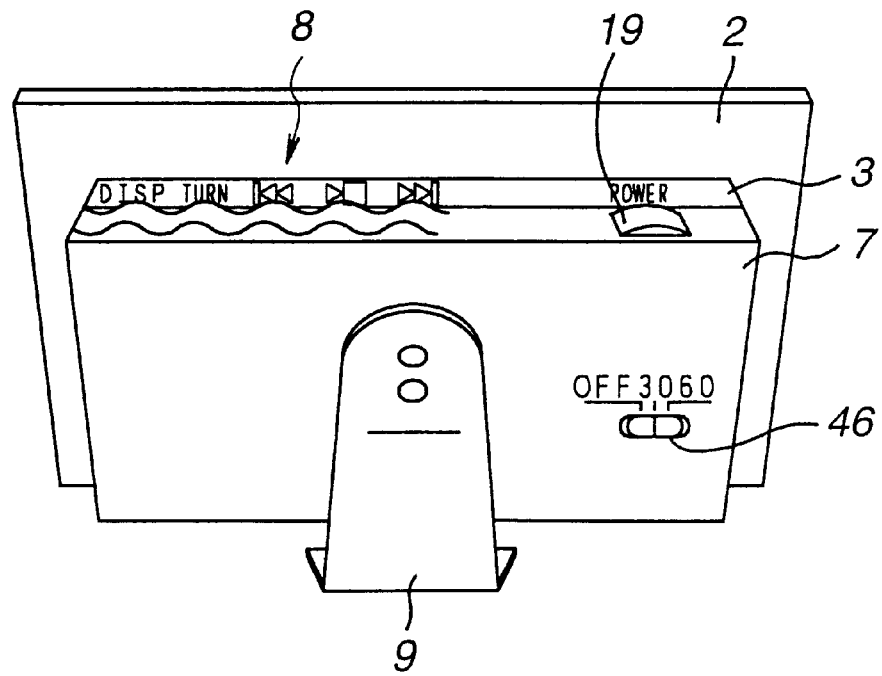
FIG. 2 is a perspective view, from the rear, of the image display apparatus in FIG. 1.

Referring now to FIG. 1 being a front view and FIG. 2 being a rear perspective view, there is illustrated a first embodiment of image display apparatus according to the present invention. The image display apparatus is generally indicated with a reference 1. The image display apparatus I is adapted to display on a display panel image data recorded in a memory card which is an external recording medium.

The image display apparatus 1 is an assembly of an acryl-made transparent cover plate 2, an ornamental plate 3 having formed therein an opening through which a display panel 4 is viewed and a hole through which a human body recognition sensor 5 which will further be described later is exposed, and an apparatus enclosure 7 having the display panel 4 and human body recognition sensor 5, in this order as counted from the front. The cover plate 2 and ornamental plate 3 are fixed to the apparatus enclosure 7 with fixtures 6 as shown.

The display panel 4 is a thin, lightweight structure such as an LCD display or plasma display to display an image based on a to-be-displayed image signal supplied from an image processing block which will further be described later.

FIG. 2 shows the image display apparatus 1 placed with the longer side down. As shown in FIG. 2 (also see FIG. 3), the apparatus enclosure 7 has an operation panel 10 provided thereon with a group of control buttons 8 and a power switch 19. The apparatus enclosure 7 has provided on the rear side thereof in a place near the right end a slide switch 46 to set a sleep time as will further be described later. The image display apparatus 1 has further a support leg 9 fixed to the apparatus enclosure 7 with a screw, and thus the apparatus 1 is supported by the leg 9 and transparent cover plate 2 on a desk top, for example.

Figure 3:
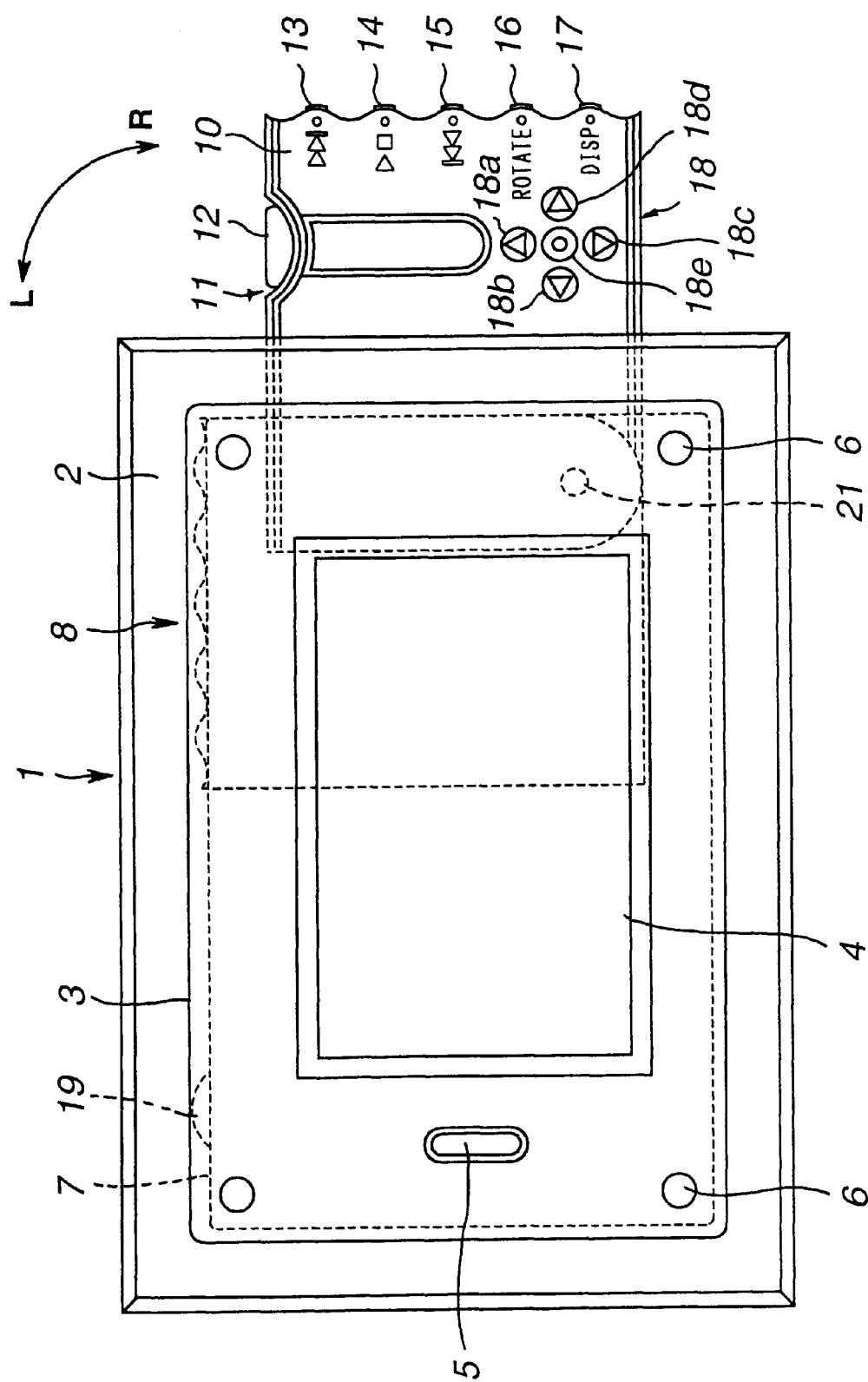
FIG. 3 is a front view of the image display apparatus in FIG. 1 with the operation panel full turned to the right.

FIG. 3 is a front view of the image display apparatus 1 with the operation panel 10 full turned to the right. The operation panel 10 can be turned 90 deg. about a pivot 21 in relation to the apparatus enclosure 7. FIG. 3 shows the apparatus 1 with the operation panel 10 turned 90 deg. in the direction of arrow R. From this position, the operation panel 10 can be turned 90 deg. in the direction of arrow L for accommodation into the apparatus enclosure 7.

The operation panel 10 is provided with a memory card slot 11 through which a memory card 12 can be introduced from outside into the operation panel 10. The memory card slot 11 has provided therein a memory card connector for connection of the memory card 12.

The memory card 12 is a recording medium capable of storing at least digital image data such as a memory card, miniature card or the like using a flash EEPROM (electrically erasable and programmable ROM), abbreviated as so-called SSFDC (solid-state floppy disc card).

The group of control buttons 8 on the operation panel 10 includes, as counted from the upper right with the operation panel 10 turned to the right, a fast forward/search button 13, play start/stop button 14, fast backward/search button 15, rotate (ROTATE) button 16 and a display (DISP) button 17. Also the operation panel 10 has a set of select and set keys 18 provided thereon below the memory card slot 11 (when the operation panel 10 is turned to the right) or at the left of the memory card slot 11 (when the operation panel 10 is accommodated in the apparatus enclosure 7.

The fast forward button 13 is used for fast forward access to and search of image information recorded in the memory card 12. The play start/stop button 14 starts and stops playback of image information recorded in the memory card 12. The fast backward /search button 15 is provided for fast backward access to and search of image information recorded in the memory card 12. The ROTATE button 16 is used to record into the memory card 12 displaying-direction information on an image to be displayed on the display panel 4. The DISP button 17 turns on and off display of photography data and index information, for example, added to the image information. The set of select and set keys 18 is used to select and set a desired one of items displayed on the display panel 4. The set of select and set keys 18 includes keys 18a, 18b, 18c and 18d for designating the upward, rightward, downward and leftward directions, and a click button 18e provided in the middle among the keys to set the selected item.

When the image display apparatus 1 is placed as shown in FIG. 3, the character and symbol markings provided by the buttons on the control panel 10 are frontally viewable from the user of the apparatus 1. The user can operate the group of control buttons 8 of the apparatus 1 while viewing the display panel 4. When the operation panel 10 is turned in the direction of arrow R, it lies with its longer side down. So, each of the buttons 8 can be operated without the necessity of placing the apparatus 1 with the shorter side down, while viewing an image displayed with the apparatus 1 placed its longer side down. When the operation panel 10 is turned 90 deg. in the direction of arrow L, the buttons 13 to 17 come to the top of the apparatus enclosure 7 as shown in FIG. 2. Namely, they come to the position of the group of control buttons 8 shown in FIGS. 2 and 3. The character and symbol markings for the respective buttons 13 to 17 are also provided on the top of the ornamental panel 3. Therefore, the buttons 13 to 17 can easily be operated by the user even when the operation panel 10 is accommodated in the apparatus enclosure 7.

Since the memory card slot 11 is provided on the operation panel 10 as mentioned above, it will not be exposed outside when the operation panel 10 is accommodated in the apparatus enclosure 7.

Figure 4:
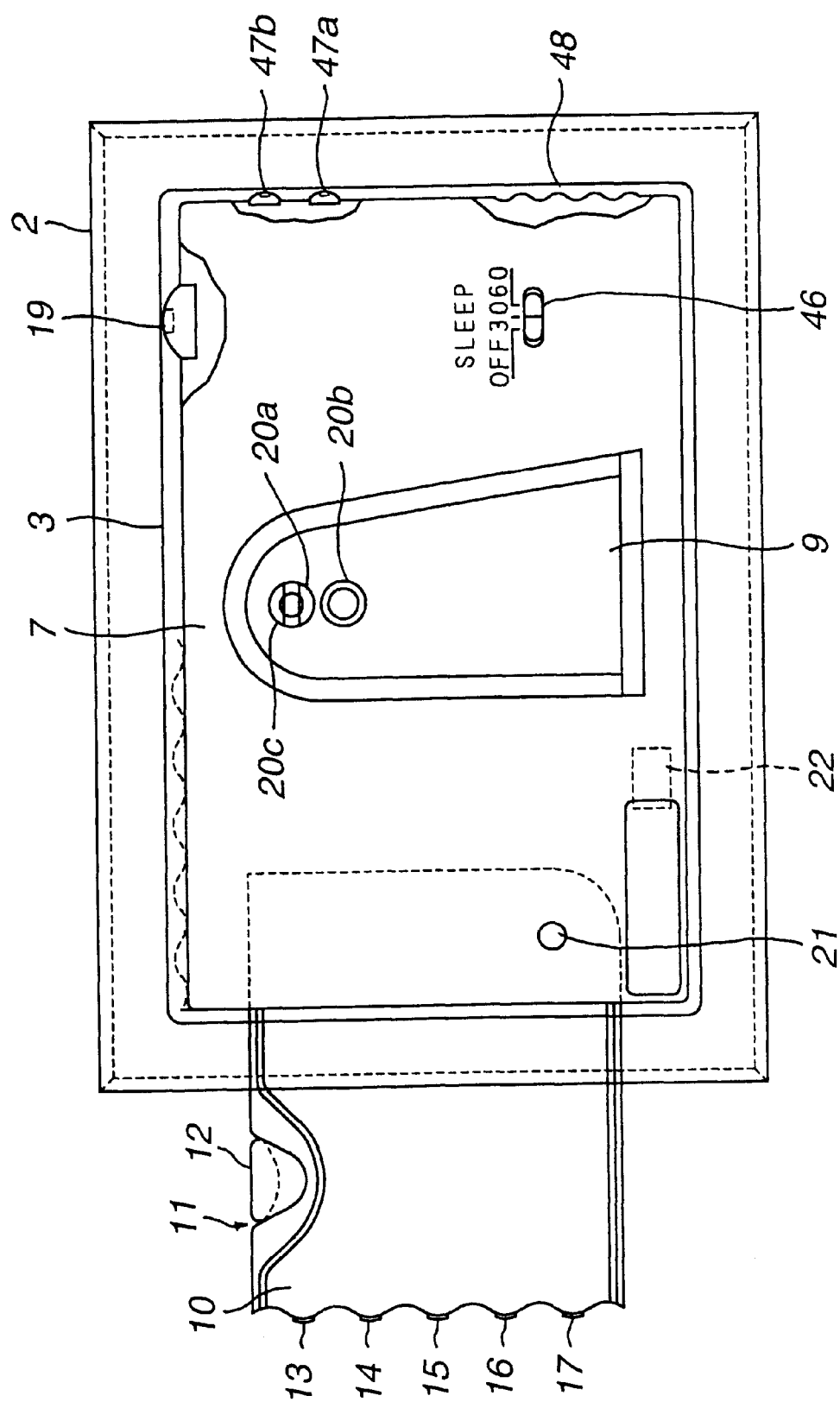
FIG. 4 is a rear view of the image display apparatus in FIG. 1 with the operation panel full turned to the left.

FIG. 4 is a rear view of the image display apparatus 1 with the operation panel 10 turned 90 deg. in relation to the apparatus enclosure 7.

As shown, the support leg 9 has two fixing holes 20a and 20b, upper and lower, formed therein along the length thereof. To use the full effective length of the support leg 9, a screw 20c is used in the upper fixing hole 20a to fix the support leg 9 to the apparatus enclosure 7. On the other hand, when the screw 20c is used in the lower fixing hole 20b to secure the support leg 9 to the apparatus enclosure 7, the effective length of the support leg 9 will be shorter. The support leg 9 thus secured to the apparatus enclosure 7 works with the transparent cover plate 2 to support the apparatus 1 on a flat surface such as desk top surface. Namely, when the support leg 9 is fixed to the apparatus enclosure 7 using the upper fixing hole 20a therein, its larger effective supporting length is usable so that the display panel 4 will form a correspondingly larger angle with the surface of the desk top. On the other hand, when the lower fixing hole 20b is used to fix the support leg 9 to the apparatus enclosure 7, the display panel 4 will define a correspondingly smaller angle with the desk top surface. Thus, the angulation of the surface of the display panel 10 can be selected for the user to have an easier viewing of an image on the display panel 4. Further, the center of the bottom side of the support leg 9 is deviated from a straight line through the upper and lower fixing holes 20a and 20b, and the bottom side is somewhat extended to the right as viewed from the rear, which is intended to stably support the image display apparatus 1 placed with the shorter side down.

The apparatus enclosure 7 has further disposed thereon controls which are fixed, not movable like the group of control buttons 8 (including the buttons and keys 13 to 18). That is, as previously mentioned, the power switch 19 is provided on the top of the apparatus enclosure 7 and the slide switch 46 operable by the user to set a time for which a displaying status is to be continuously kept or a sleep time is provided on the back of the apparatus enclosure 7. In addition, the apparatus enclosure 7 has provided on an lateral side thereof opposite to the side where the operation panel 10 is located brightness control buttons 47a and 47b (BRIGHT+ and –) to adjust the screen brightness of the display panel 4. The button 47a increases the screen brightness while the button 47b decreases it. Further, a speaker 48 is provided at the lateral lower portion of the apparatus enclosure 7. Also, a connector 22 for connection of a DC source is provided at the lower left portion of the apparatus enclosure 7 as viewed from the rear.

Figure 5:
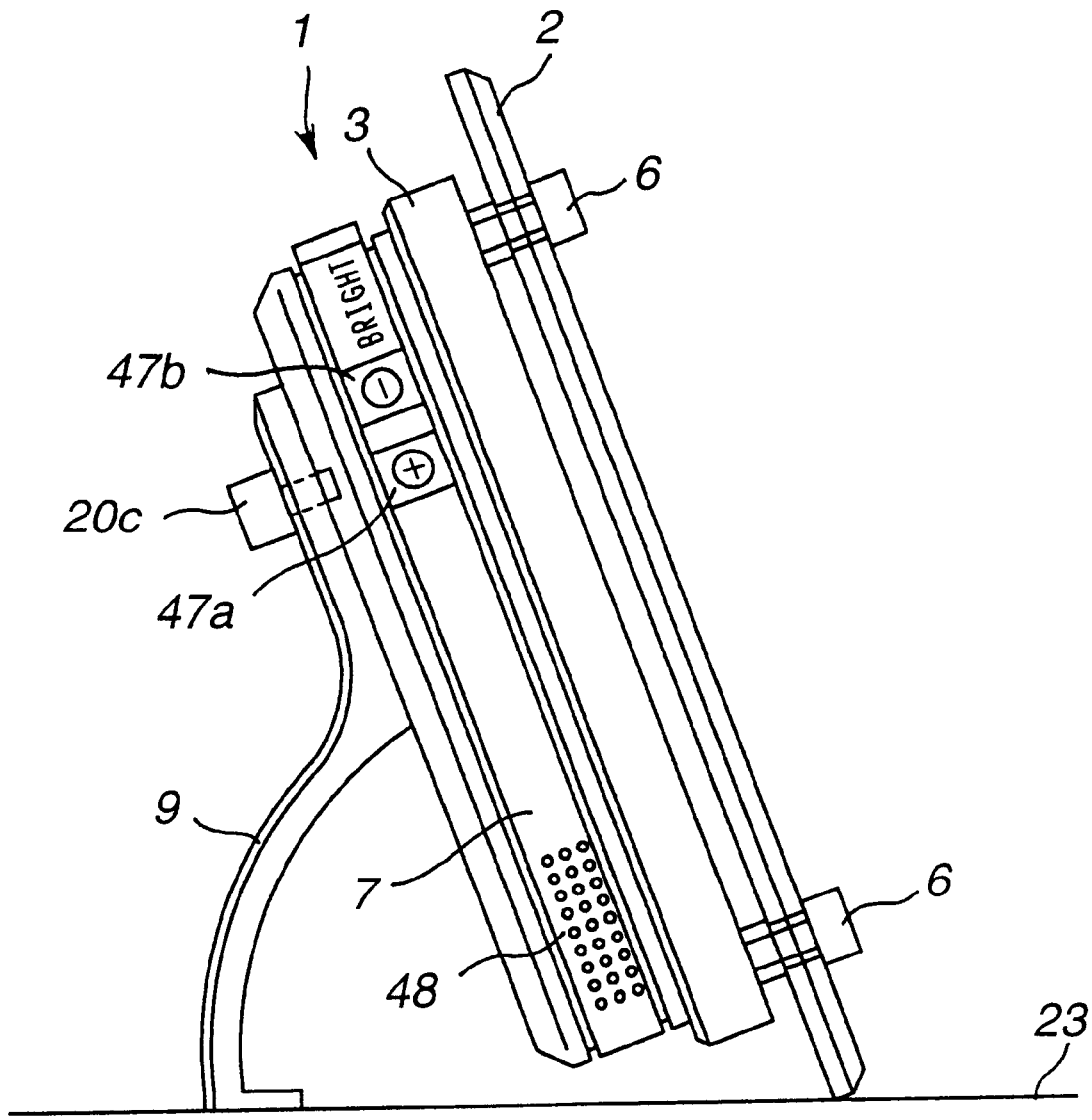
FIG. 5 is a side elevation of the image display apparatus in FIG. 1.

FIG. 5 is a side elevation of the image display apparatus 1, showing the lateral side of the apparatus enclosure 7 on which the speaker 48 is provided in addition to the aforementioned brightness control buttons 47a and 47b. Supported by the support leg 9 and transparent cover plate 2, the image display apparatus 1 is placed on a surface 23 of a desk top as shown.

Figure 6:
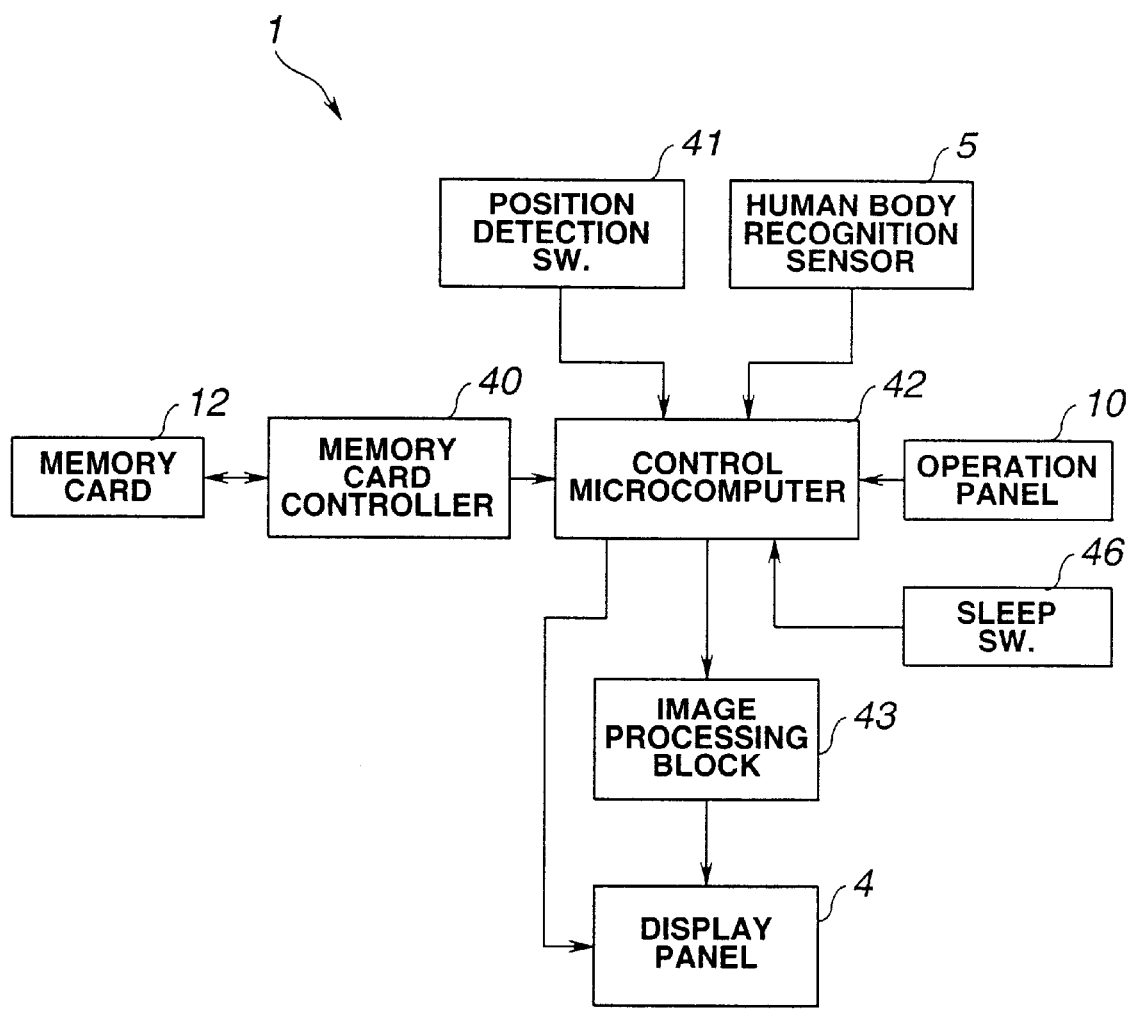
FIG. 6 is a schematic block diagram of the image display apparatus.

FIG. 6 is a schematic block diagram of the image display apparatus 1. The image display apparatus 1 is internally constructed as will be described below with reference to FIG. 6:

The memory card 12 has already recorded therein image information acquired as compressed image data by means of an electronic still camera.

For playback of an image recorded in the memory card 12, a control microcomputer 42 reads the compressed image data from the memory card 12 via a memory card controller 40 and stores it into a built-in DRAM. The compressed image data is expanded or decompressed in an image processing block 43 and stored back into the DRAM. The image data thus stored back in the DRAM is processed by the image processing block 43 for display on the display panel 4.

More specifically, in the image display apparatus 1, the control microcomputer 42 is used to record a displaying-direction information on an image to be displayed on the display panel 4 into the memory card 12 via the memory card controller 40 while displaying on the display panel 4 a to-be-displayed image signal corresponding to the displaying-direction information read from the memory card 12.

The displaying-direction information relates a direction in which an image is to be displayed on the display panel 4. More particularly, the information is entered by the user pressing the ROTATE button 16 on the operation panel 10 to designate the normal direction of the image when image information is initially read from the memory card 12 for display on the display panel 4. By pressing the ROTATE button 16 a maximum of three times for one image, the user can rotate the image clockwise to designate his or her desired normal direction of the image.

The control microcomputer 42 writes into the memory card 12 a displaying-direction information generated via the image processing block 43 by pressing the ROTATE button 16 for image rotation, along with image information. The memory card 12 having written therein the displaying-direction information may be inserted into the same image display apparatus 1 as it is, or into any other image display apparatus.

With the memory card 12 kept inserted in the same image display apparatus 1, the user can display an image on the display panel 4 in a normal direction corresponding to the displaying-direction information. Even with the image display apparatus 1 placed in a different position from that when the displaying-direction information is recorded in the memory card 12, the image can be displayed in the same normal direction. More specifically, a position detection switch 41 is provided to detect whether the image display apparatus 1 is placed with the longer or shorter side down, and send a detection signal to the control microcomputer 42 which will read the displaying-direction information from the memory card 12 via the memory card controller 40. Thus the image can be displayed in the same normal direction. The position detection switch 41 may be either a type of which a moving element is moved in two directions or a type of which a pendulum type element is moved in all directions.

Figure 7:
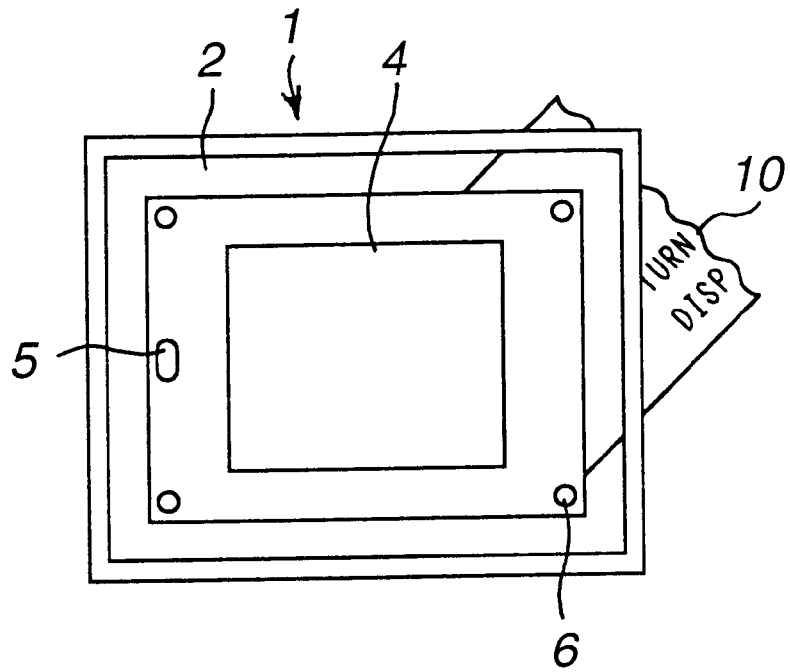
FIG. 7 shows the image display apparatus with the operation panel going to be removed.
Figure 8:
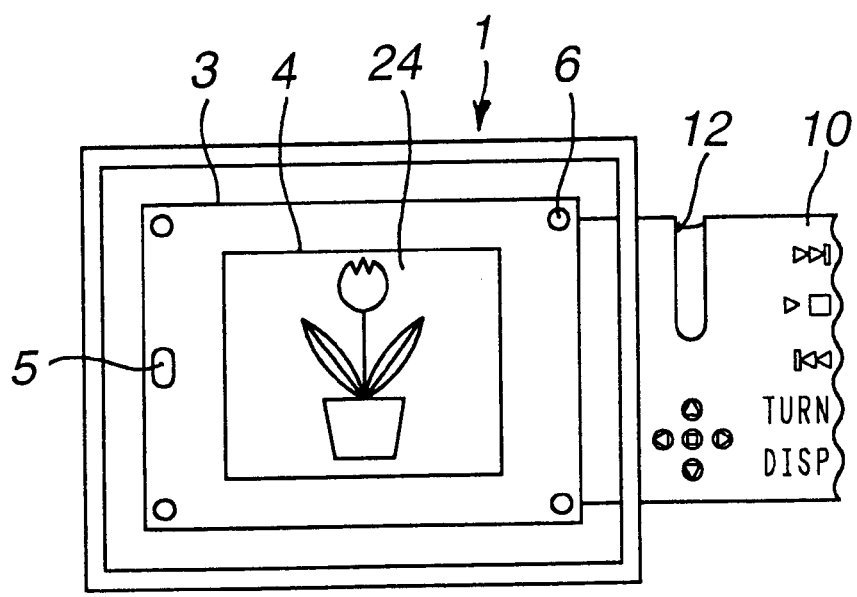
FIG. 8 shows the procedure from turning on the power switch after removal of the operation panel until the memory card is inserted.

The procedure from recording of the displaying-direction information into the memory card 12 up to display of an image corresponding to the displaying-direction information will further be described below with reference to FIGS. 7 to 10:

First, the operation panel 10 is turned to appear out of the apparatus enclosure 7 as shown in FIG. 7, the power switch 19 shown in FIG. 8 is turned on, the ROTATE button 16 is pressed a maximum of 3 times to determine a normal displaying direction for each image 24 on the display panel 4, and information related to the normal displaying direction is recorded as the displaying-direction information along with the image 24 into the memory card 12.

Figure 9:
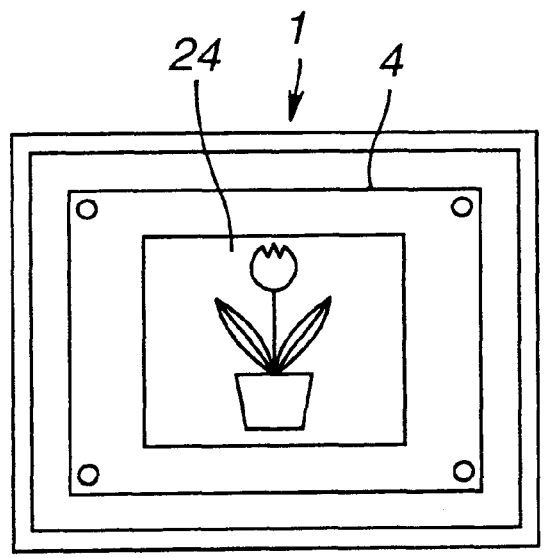
FIG. 9 shows the image display apparatus placed with the longer side down to reproduce an image.
Figure 10:
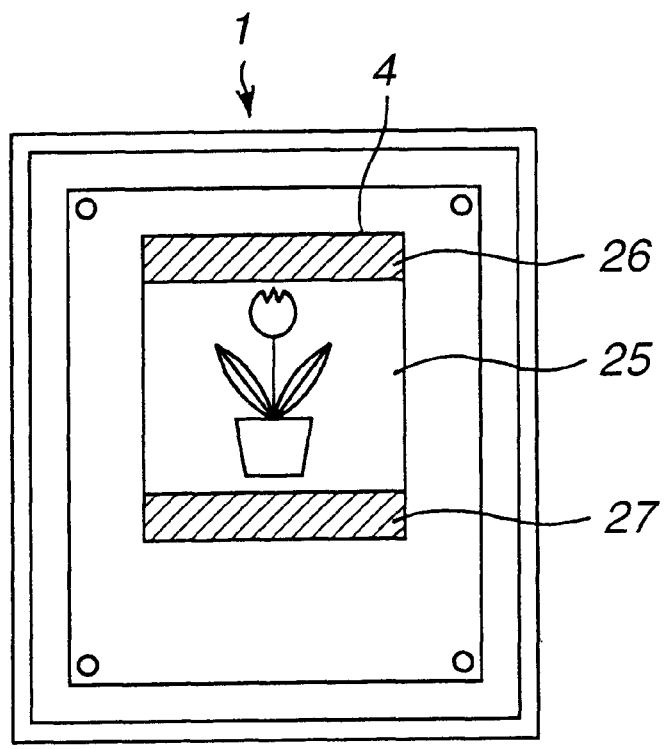
FIG. 10 shows the image display apparatus placed with the shorter side down to reproduce an image.

Thereafter, even with the image display apparatus 1 placed with the longer side down as in FIG. 9 or with the shorter side down as in FIG. 10, the image can be displayed in a correct direction with no designation of normal direction for each image. When the apparatus 1 is placed with the shorter side down, however, nondisplay areas 26 and 27 take place at the upper and lower portions, respectively, of the screen of the display panel 4.

Further the image display apparatus 1 is provided with the human body recognition sensor 5 shown in FIGS. 1 to 6. When the human body recognition sensor 5 recognizes a human body existing near the apparatus 1, it changes the displaying status of the display panel 4. The human body recognition sensor 5 may be a recognition sensor such as an ultraviolet sensor to detect ultraviolet ray coming from a human body, ultrasound sensor to transmit an ultrasound and receive a reflected sound from a human body or object existing near the apparatus 1, light sensor to emit a light from a laser or LED (light-emitting diode) and detect a return light from a human body or object existing near the apparatus 1, or the like. In this image display apparatus 1, the human body recognition sensor 5 is detects the hand of a user or a part of the user's body, for example, at a distance of 20 cm or less from the front of the sensor 5 and provides a detection signal which will be sent to the control microcomputer 42.

When the control microcomputer 42 supplied with the detection signal from the human body recognition sensor 5, it will turn on and off supply of power from a power supply block (not shown) to the display panel 4. More specifically, when the human body recognition sensor 5 detects the user's hand placed in front thereof, the detection signal is supplied to the control microcomputer 42 which will allow the power supply block to supply the power to the display panel 4. The display panel 4 will thus be turned on.

If a display time of 30 or 60 min, for example, is set using the continuous display/sleep select slide switch 46 disposed on the back of the apparatus enclosure 7, the display panel 4 is kept turned on for the time of 30 to 60 min after the user's hand placed at a position of 20 cm or less from the human body recognition sensor 5 is detected by the latter.

Figure 11:
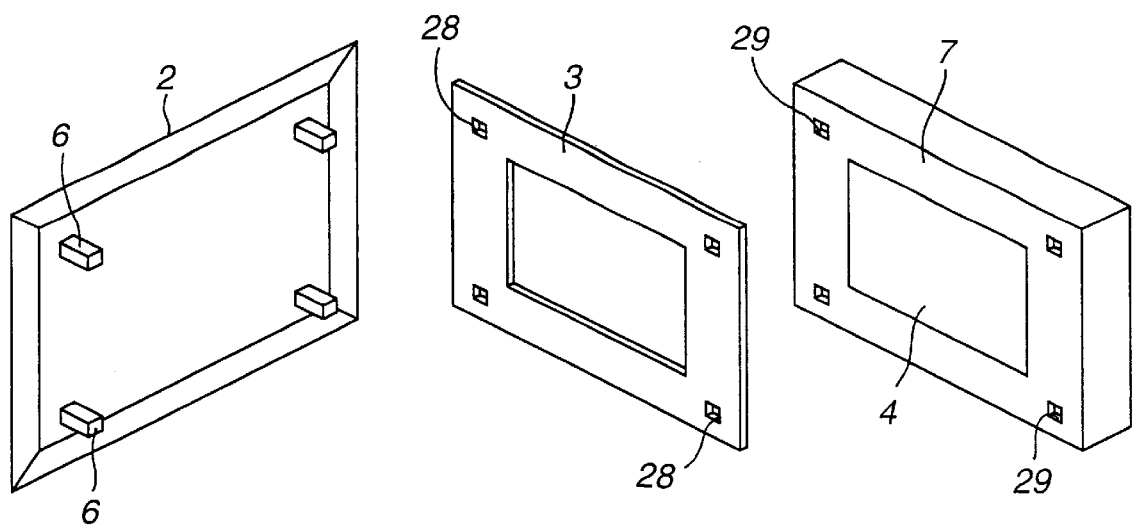
FIG. 11 is an exploded perspective view of the image display apparatus, showing a separated transparent cover plate, ornamental plate and apparatus enclosure.

As shown in FIG. 11, the image display apparatus 1 can be disassembled into the transparent cover plate 2, ornamental plate 3 and apparatus enclosure 7. The ornamental plate 3 may be replaced with another selected from ones different in color and design according to the atmosphere in a location of installation, for example, a room, where the apparatus 1 is used. The transparent cover plate 2, ornamental plate 3 and apparatus enclosure 7 can be assembled together by inserting the fixtures 6 each into a fixture retainer 29 in the apparatus enclosure 7 through a hole 28 in the ornamental plate 3.

Figure 12:
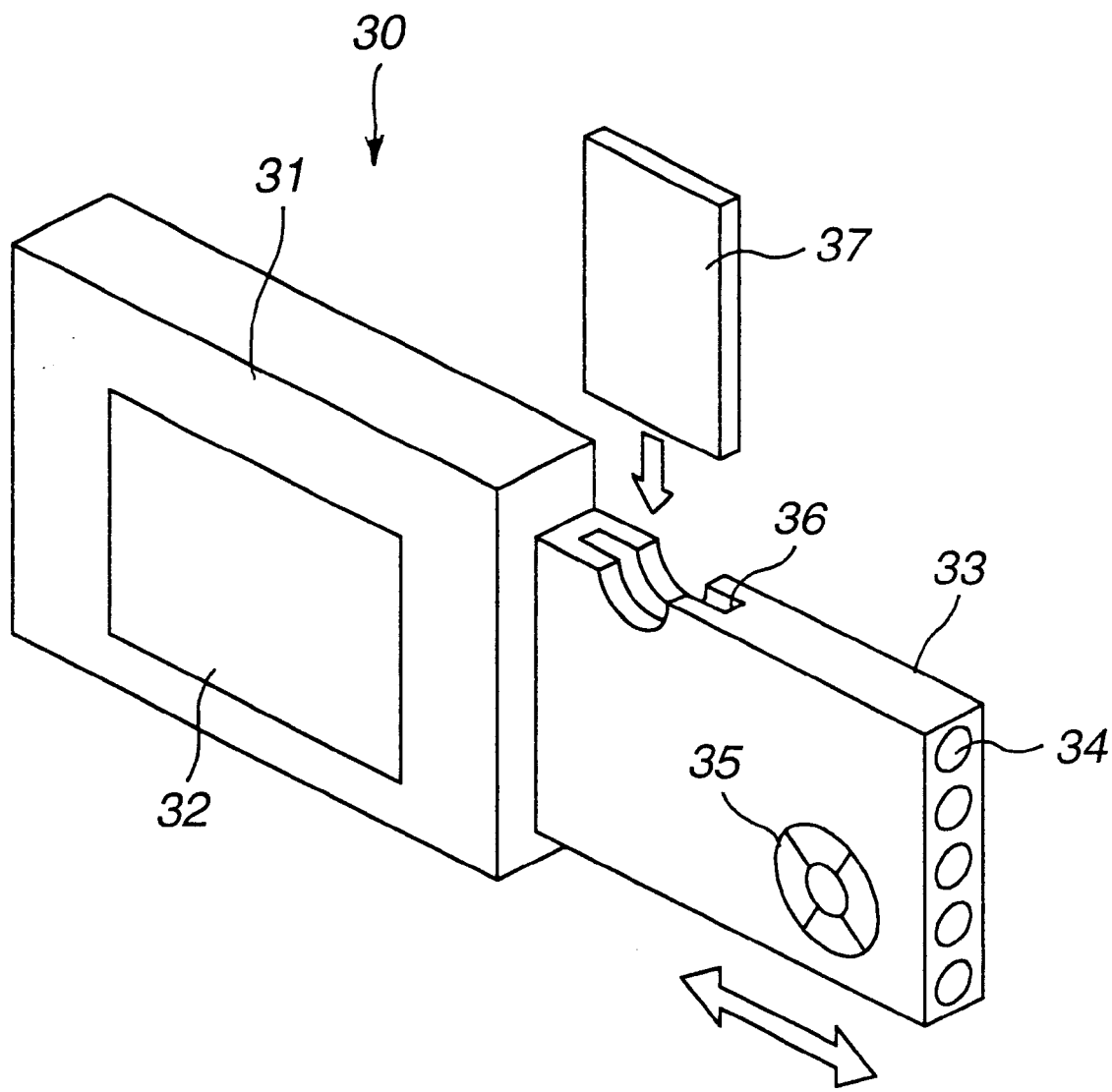
FIG. 12 is a perspective view of a variant of the image display apparatus in which the operation panel is designed for sliding insertion into or extraction from inside the apparatus enclosure.

In the first embodiment having been described in the foregoing, the operation panel 10 is extracted by turning 90 deg. about the pivot 21 as shown in FIGS. 3 and 4. However, the image display apparatus 1 may be modified as shown in FIG. 12 which is a perspective view of a variant of the image display apparatus 1. In this variant, the operation panel is designed for sliding insertion into or extraction from inside the apparatus enclosure. The variant of the image display apparatus 1 according to the present invention is generally indicated with a reference 30.

More specifically, the image display apparatus 30 comprises an apparatus enclosure 31 having a display panel 32, and an operation panel 33 provided with controls 34 and 35, as shown in FIG. 12. The operation panel 33 is designed for sliding insertion into or extraction from the apparatus enclosure 31. As shown, the operation panel 33 has formed therein a memory card slot 36 through which a memory card 37 is to be inserted into the operation panel 33. Thus, also in this image display apparatus 30, the memory card slot will not be exposed so long as the operation panel 33 is accommodated into the apparatus enclosure 31.

Figure 13:
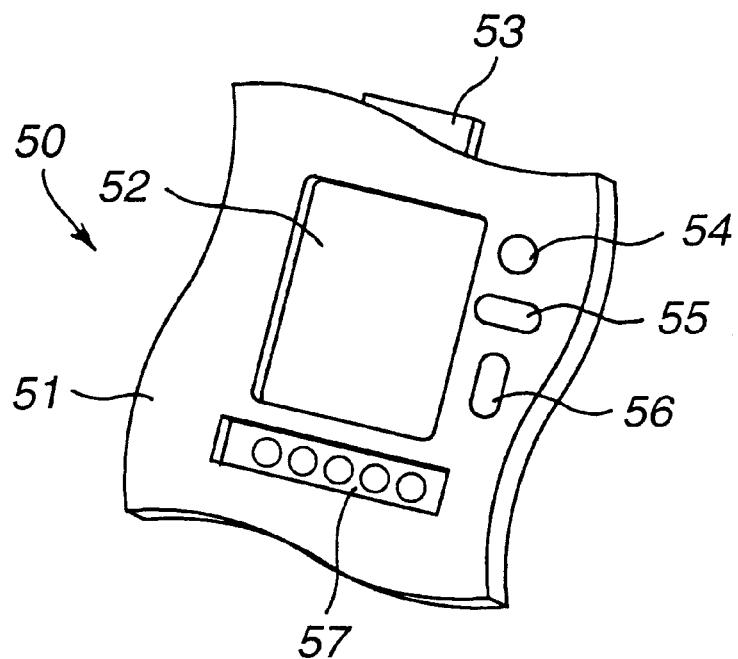
FIG. 13 is a perspective view, from the front, of another embodiment of image display apparatus.

Next, a second embodiment of the present invention will be described herebelow with reference to FIGS. 13 and 14. The image display apparatus is generally indicated with a reference 50. FIG. 13 is a front perspective of the image display apparatus 50, and FIG. 14 is a rear perspective view of the image display apparatus 50 in FIG. 13.

As shown in FIG. 13, the image display apparatus 50 comprises an enclosure 51 like a photo holder or mount having a decorative design. The enclosure 51 has provided on the front side thereof a display panel 52, infrared communication element 54, light sensor 55, human body recognition sensor 56, and operation panel 57, and on the top thereof a socket 53 in which a memo card as an external recording medium is to be set.

Figure 14:
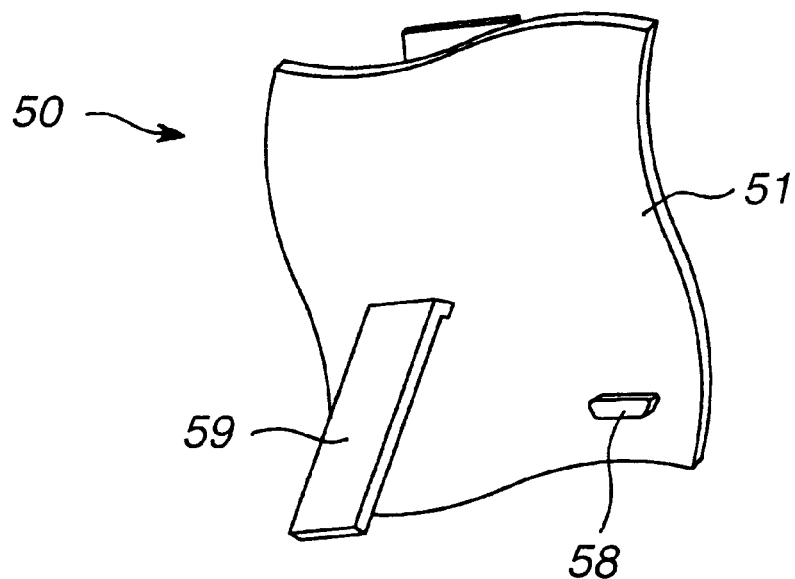
FIG. 14 is a perspective view, from the rear, of the image display apparatus in FIG. 13.

As shown in FIG. 14, the enclosure 51 has provided on the back thereof a support leg 59 to support the enclosure 51 in upright position, and a terminal 58 for connection of a serial cable which will further be described later. In the enclosure 51 shown in FIGS. 13 and 14, there is provided a dry cell or secondary cell as a power source. Therefore, this image display apparatus 50 is not provided with any power cord. In case the apparatus 50 is to be supplied with an external power, a power cord will of course be provided on the back thereof, for example.

Although the apparatus enclosure 51 is formed like a photo mount having a decorative design as in FIGS. 13 and 14, it may be designed like a photo.

Figure 15:
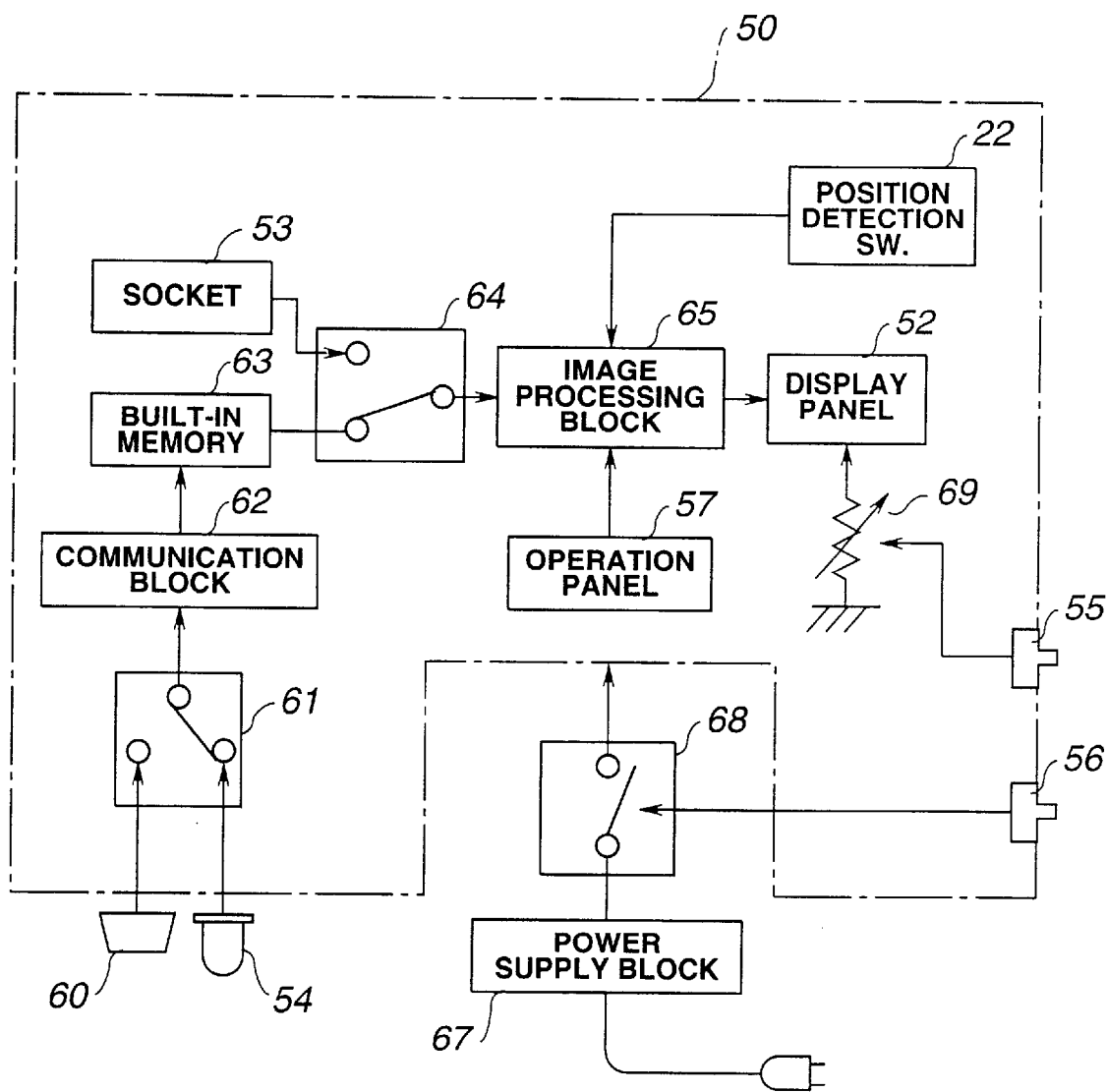
FIG. 15 is a schematic block diagram of the image display apparatus shown in FIGS. 13 and 14.

FIG. 15 is a schematic block diagram of the image display apparatus 50, showing its internal construction. As in FIG. 15, the terminal 58 is provided for connection of a serial cable, for example. The infrared communication element (IrDA) 54 is an I/O port for communication using infrared rays. Therefore, the image display apparatus 50 is connectable via the terminal 58 or infrared communication element 54 to an external apparatus such as a digital still camera, personal computer, film scanner or the like from which at least a digital image data is supplied to the image display apparatus 50. The image display apparatus 50 receives a digital image data from an external apparatus via the terminal 58 or infrared communication element 54. It should be noted that the infrared communication element 54 is normally selected for data communication between the image display apparatus 50 and external apparatus.

There is also provided a communication mode select switch 61 to selectively switch the data communication by the terminal 58 and that by the infrared communication element 54 between them to pass a received image data to a communication block 62. In the image display apparatus 50, the data communication by the infrared communication element 54 is normally selected as mentioned above. When a serial cable is connected to the terminal 58, however, the communication mode select switch 61 is activated to set up a data communication via the terminal 58.

Receiving data from an external apparatus via the infrared communication element 54 or terminal 58 and further via the communication mode select switch 61, the communication block 62 supplies it to a built-in memory 63 in a predetermined manner.

The socket 53 is provided for connection of an external recording medium such as a memory card as having previously been described. The image display apparatus 50 can be connected to the external recording medium via the socket 53. The socket 53 for receiving a memory card is designed to have a memory card slot. Receiving a digital image data from the external recording medium via the socket 53, the image display apparatus 50 sends it to a communication/medium select switch 64. It should be noted that the image display apparatus 50 may be provided with a plurality of such sockets 53. In this case, data communication can be made between a plurality of external recording media set in the sockets 53, respectively.

The memory 63 is built in the image display apparatus 50. It is a rewritable one to temporarily save digital image data supplied from an external apparatus via the terminal 58 or infrared communication element 54 and further the communication mode select switch 61 and communication block 62, and sends the saved digital image data to the communication/medium select switch 64. Since the built-in memory 63 is rewritable, digital image data existing therein can be replaced with another digital image data from the external apparatus as necessary.

The communication/medium select switch 64 is provided to selectively switch, for transmission to an image processing block 65, a digital image data supplied from an external recording medium in the socket 53 and one read from the built-in memory 63 between them. The image display apparatus 50 is adapted such that a digital image data read from the built-in memory 63 is normally sent to the image processing block 65. When an external recording medium is set in the socket 53, however, the communication/medium select switch 64 is activated to select a digital image data supplied from the external recording medium via the socket 53.

The image processing block 65 processes in a predetermined manner a digital image data read from the built-in memory 63 and supplied via the communication/medium select switch 64 or a one supplied from the socket 53 and sent via the communication/medium select switch 64, to generate image signal for display on the display panel 52.

The display panel 52 is a thin, lightweight display such as an LCD display, plasma display or the like to display an image based on a to-be-displayed image signal supplied from the image processing block 65.

There is also provided a position detection switch 66 to determine a direction in which an image is to be displayed on the display panel 52 according to the posture of the enclosure 51 of the image display apparatus 50. In particular, the position detection switch 66 is a direction select switch to allow the user to selectively set a direction in which an image is to be displayed, an automatic position detector provided with a gravity sensor or the like to automatically detect in which position the image display apparatus 50 is placed and set a position in which an image is to be displayed, or the like. Note that to save the user's labor to select such a displaying direction, the automatic position detector should desirably be adopted in the position detection switch 66. A position detection signal from the position detection switch 66 is sent to the image processing block 65.

Figure 16A:
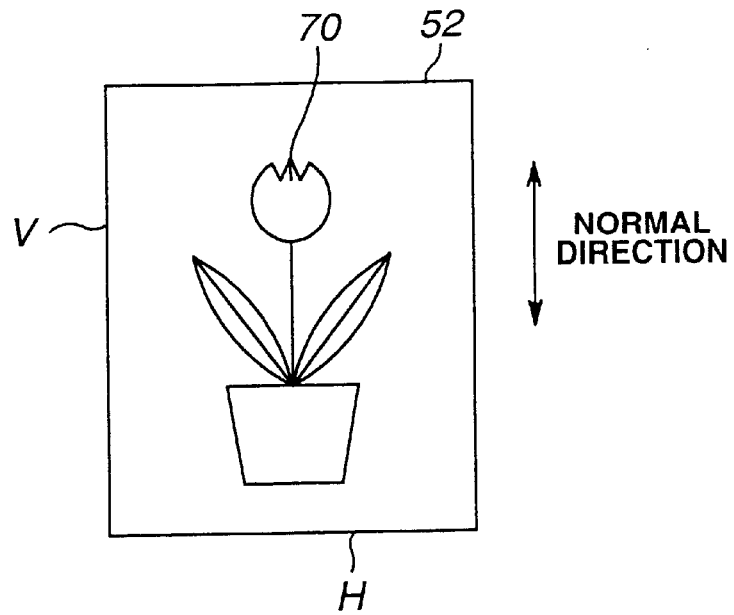
FIG. 16 shows an operation for determining a direction in which an image is displayed on the display panel of the image display apparatus in FIGS. 13 and 14.
Figure 16B:
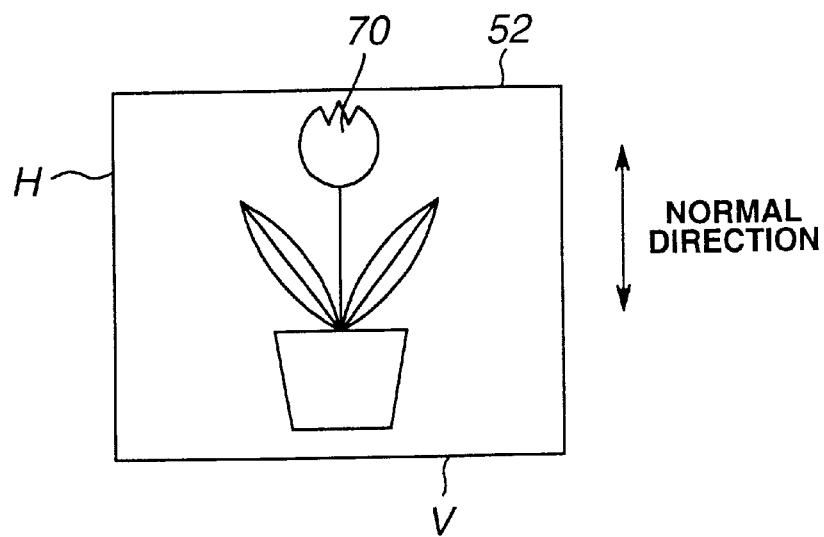

Therefore, the image processing block 65 determines a direction in which an image is to be displayed on the display panel 52 according to the position detection signal, and allows to display the image on the display panel 52 in the determined direction. Namely, in case the display panel 52 has a rectangular screen having one side indicated with a reference V and other side indicated with a reference H as shown in FIG. 16, when the position detection signal indicates that the image display apparatus 50 is placed with the shorter side down, the image processing block 65 determines a direction in which an image 70 is to be displayed on the display panel 52 so that the side V of the screen of the display panel 52 is vertical while the side H is horizontal, for example, as shown in FIG. 16A, and allows to display the image 70 on the display panel 52 in the determined direction. On the other hand, in case the display panel 52 has a rectangular screen having one side indicated with a reference V and other side indicated with a reference H, when the position detection signal indicates that the image display apparatus 50 is placed with the longer side down, the image processing block 65 determines a direction in which an image 70 is to be displayed on the display panel 52 so that the side H of the screen of the display panel 52 is vertical while the side V is horizontal as shown in FIG. 16B, and allows to display the image 70 on the display panel 52 in the determined direction.

In the example shown in FIG. 16, the rectangular screen of the display panel 52 has the side V longer than the side H. However, the rectangular screen of the display panel 52 may have the side H longer than the side V. Also, the display panel 52 may have a square screen of which the sides V and H are equal in length to each other. Further, the screen of the display panel 52 may have a polygonal shape such as circular, elliptical, trapezoidal or the like. In any case, however, the normal direction of the image 70 displayed on the display panel 52 is determined according to the posture in which the image display apparatus 50 is placed. In other words, even if the screen of the display panel 52 of the image display apparatus 50 has a circular, hexagonal or octagonal shape for which it is not easy to determine the vertical and horizontal directions as in the rectangular shape, the normal direction in which the image 70 is displayed on the display panel 52 can be determined according to a posture in which the image display apparatus 50 is placed. Of course, the apparatus 50 may be adapted so that no displaying direction will be determined according to a posture in which the image display apparatus 50 is placed.

There is also provided a power supply block 67 to supply a power to the image display apparatus 50. It converts an AC power supplied via a power cord to a DC power of a predetermined voltage before the power is supplied to the image display apparatus 50. It should be noted that the power supply block 67 may be a secondary cell or dry cell which would be able to supply a DC power of the predetermined voltage to the image display apparatus 50.

The human body recognition sensor 56 is provided to detect a human body or object existing within a predetermined range from the image display apparatus 50 and supply a detection signal to the image display apparatus 50. More particularly, the human body recognition sensor 56 may be a recognition sensor such as an ultraviolet sensor to detect ultraviolet ray coming from a human body, ultrasound sensor to transmit an ultrasound and receive a reflected ultrasound from a human body or object existing near the apparatus 1, light sensor to emit a light from a laser or LED and detect a return light from a human body or object existing near the apparatus 50, or the like A power switch 68 is also provided between the power supply block 67 and enclosure 51 of the image display apparatus 50 to switch on and off power supply from the power supply block 67 to the apparatus itself depending upon a detection signal from the human body recognition sensor 56. More specifically, only when the human body recognition sensor 56 detects a human body existing within the predetermined range from the image display apparatus 50, the power switch 68 allows to supply the power from the power supply block 67 to the image display apparatus 50 itself. When the human body is not detected within the predetermined range from the image display apparatus 50 by the human body recognition sensor 56, the power switch 68 will not allow to supply the power from the power supply block 67 to the image display apparatus 50 itself. Thus, since no display is made on the display panel 52 when not necessary (when there is a low likelihood that a user stands near the image display apparatus 50 to view a displayed image), the power consumed by the image display apparatus 50 can be saved. Namely, an energy saving is attained.

The light sensor 55 is provided to detect the brightness around the image display apparatus 50 and supply a light detection output to a display brightness controller 69.

The display brightness controller 69 is provided to adjust the brightness of the display panel 52 so that the display on the display panel 52 is turned on or off depending upon the light detection output from the light sensor 55. That is, when the light sensor 55 detects an amount of light around the image display apparatus 50, which is larger or smaller than predetermined, the display brightness controller 69 will turn on the display panel 52. The reason why the display panel 52 is turned on when the detected amount of light is larger than predetermined is that in the day time or when an intense light of illumination exists, namely, while the amount of light is larger than predetermined, the human being is normally active and some one possibly views an image displayed on the display panel 52. Therefore, when a large amount of light is detected around the image display apparatus 50, the display panel 52 is turned on. On the other hand, it is considered that in the night or when the illumination is weak, the display on the display panel 52 is not easy to see. That is why the display panel 52 is turned on when the detected amount of light around the image display apparatus 50 is smaller than predetermined.

The display brightness controller 69 may be a one which can adjust the display brightness of the display panel 52 according to the light detection output from the light sensor 55. More specifically, the display panel 52 is made easier to view in a bright environment as in the day time by increasing its display brightness, and in a relative dark environment as in the night or evening by decreasing the display brightness somewhat. When the light sensor 55 detects a larger amount of light (in the day time, for example) than predetermined, the display brightness controller 69 will increase the display brightness of the display panel 52. On the other hand, when the light sensor 55 detects a smaller amount of light (in the night or evening, for example) than predetermined, the display brightness controller 69 will decrease the brightness of a display on the display panel 52.

The control panel 57 has provided thereon control buttons which are used by the user to control the operation of the image display apparatus 50. While the image processing block 65 allows operation menu items to be displayed on the display panel 52, the user selects a desired one of the menu items by using a corresponding control button on the operation panel 57 to operate the image display apparatus 50 in the selected mode. Note that the operation menu items may include a function to switch on/off the human body recognition sensor 56 and light sensor 55, slide show of a digital image, fade display and the like.

Digital image data stored in the built-in memory 63 can be printed out by a printer. In this case, a digital image data stored in the built-in memory 63 is sent via the infrared communication element 54 to an infrared communication type printer which will print out the digital image data, or via the terminal 58 to a serial cable-connectable printer which will print out the digital image data.

As having been described in the foregoing, the image display apparatus 50 comprises an enclosure shaped to have the form of a photo mount for a silver-film photo and thus has a decorative design. Also a displayed image can easily be changed to other without the time and labor for replacement of a photo with another as with a silver-film photo mount since a to-be-displayed image is supplied from an external apparatus or external recording medium.

Figure 17:
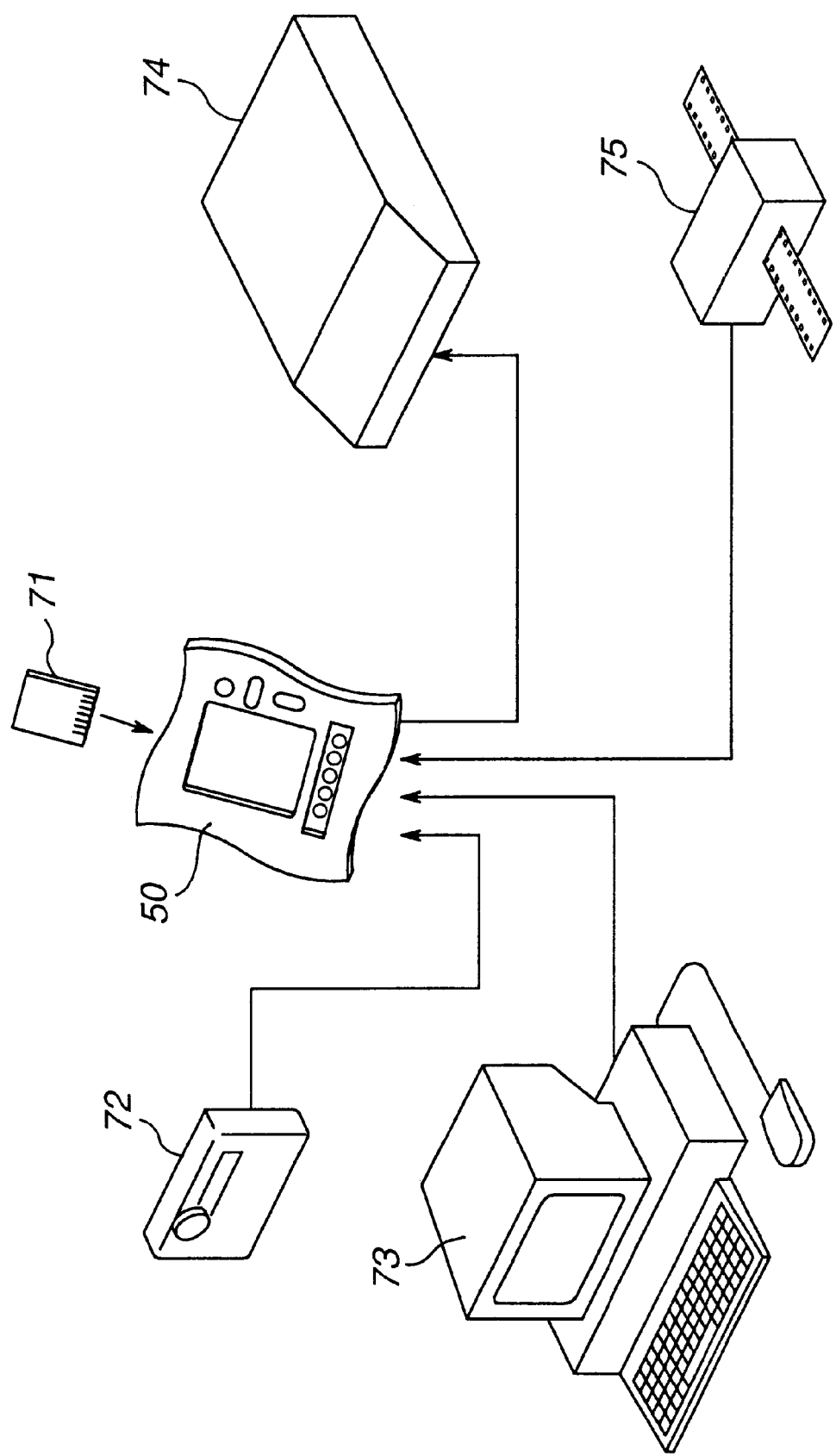
FIG. 17 shows the connection between the image display apparatus in FIGS. 13 and 14 and various external apparatuses and external recording media.

Referring now to FIG. 17, there is schematically illustrated a data communication between the image display apparatus 50 and various external apparatuses and recording media.

As shown in FIG. 17, the image display apparatus 50 is connectable to a digital still camera 72, personal computer 73, film scanner 75, printer 74 and the like each as an external apparatus. Data communication between these external apparatuses and image display apparatus 50 is done via the infrared communication element 54 and serial cable terminal 58. Also, the memory card 71 as an external recording medium can be set in the socket 53 of the image display apparatus 50.

As mentioned above, the built-in memory 63 of the image display apparatus 50 can be supplied with digital image data from the external apparatuses such as the digital still camera, not via the personal computer. So other than a user of a personal computer can also be provided with a displayed digital image. Thus, the image display apparatus 50 according to the present invention is superior in portability to the personal computer as long as the limited function, namely, viewing of displayed images, is concerned.

Since an external recording medium such as a memory card can be removably set in the socket 53 of the image display apparatus 50, digital image data recorded in the external recording medium can be displayed on the display panel 52. With a plurality of such sockets 53 provided on the image display apparatus 50, data communication can be made between the plurality of external recording media. Further, when a photo collection of a celebrity (photos by a professional photographer, for example) is recorded in a memory card as an external recording medium, such digital images can easily be read from the memory card and displayed on the display panel 52 for viewing. Namely, the image display apparatus 50 can be used for playback of such a photo collection.

The image display apparatus 50 is provided with the infrared communication element 54 and serial cable terminal 58, which enable an infrared data communication and serial data communication, respectively. Thus, data (digital image data) in the built-in memory 7 can easily be rewritten.

Further, the image display apparatus 50 is provided with the operation panel 57 at which various operation menu items can be selected for some modes of digital image display.

Also, the image display apparatus 50 comprises the decoratively designed enclosure as shown in FIGS. 13 and 14, which provides for a piece of decoration.

As having been described in the foregoing, the image display apparatus according to the present invention can record in a recording medium information on a direction in which an image signal is to be displayed on the image displaying means and read it from the recording medium for use when an image is displayed. Therefore, an image can be displayed in a correct direction on the apparatus placed with the shorter or longer side down without any designation of a normal displaying direction for the image.

Also, a digital image can easily be viewed even with no personal computer or display apparatus, for example. In addition, digital images such as a photo collection of a celebrity supplied via an external recording medium can easily be viewed. Moreover, the image display apparatus according to the present invention can be designed to have a decorative feature such as a silver-film photo mount or frame.

What is claimed is:

1. An image display apparatus for displaying image data read from a recording medium, comprising:

image processing means for generating an image signal by processing image data read from the recording medium in a predetermined manner;

image displaying means for displaying the image signal generated by the image processing means;

controlling means for recording into the recording medium information on a direction in which an image of the image signal is to be displayed on the image displaying means and displaying the image on the image displaying means in a direction corresponding to the displaying-direction information read from the recording medium; and an operation panel provided with play start/stop control buttons for recording the displaying-direction information into the recording medium and image information access/search control buttons for searching the image information, wherein the operation panel is accommodable in an enclosure of the apparatus.

2. The apparatus as set forth in claim 1, further comprising means whereby the recording medium is set into the apparatus from outside.

3. The apparatus as set forth in claim 1, further comprising means for recognizing a human body existing near the apparatus and providing a detection signal based on which a displaying status of the image displaying means is changed.

4. The apparatus as set forth in claim 3, further comprising time setting means for setting an expiration time at which the displaying status of the image displaying means is changed, wherein the controlling means continuously holds the displaying status of the image displaying means for a time set by the time setting means.

5. The apparatus as set forth in claim 1, further comprising mounting means whereby the operation panel is accommodable into the apparatus enclosure by pivoting or sliding.

6. An image displaying apparatus for displaying image data read from a recording medium, comprising:

image signal generating means for generating an image signal for display based on image information read from the recording medium;

image displaying means for displaying the image signal produced by the image signal generating means; and means for determining a direction in which an image of the image signal is to be displayed on the image displaying means according to a posture in which the apparatus is placed and information on a direction in which an image of the image signal is to be displayed read from the recording medium.

7. The apparatus as set forth in claim 6, further comprising means whereby the recording medium is set into the apparatus from outside.

8. The apparatus as set forth in claim 6, further comprising:

means for communication with an external apparatus to transmit and receive image data to and from the external apparatus;

an image memory for storage of image data transmitted via the means for communication with the external apparatus; and means for communication with the recording medium to transmit and receive image data to and from the recording medium, wherein the image signal generating means generates the image signal based on image data stored in the image memory or on image data transmitted via the means for communication with the recording medium.

9. The apparatus as set forth in claim 8, wherein the means for communication with the recording medium includes means for communicating with a plurality of recording media to transmit and receive data to and from the plurality of recording media.

10. The apparatus as set forth in claim 8, wherein the means for communication with the external apparatus includes infra-red ray communication means for communication with the external apparatus to transmit data to and from the external apparatus using infra-red rays.

11. The apparatus as set forth in claim 10, wherein the means for communication with the external apparatus includes:

serial-cable communication means for data communication over a serial cable; and communication mode switching means for selectively switching between the infrared-ray communication means and the serial-cable communication means.

12. The apparatus as set forth in claim 11, wherein the communication mode switching means is adapted to change, when the external apparatus is connected to the serial-cable communication means, the data communication by the infrared-ray communication means over to the data communication by the serial-cable communication means.

13. The apparatus as set forth in claim 8, further comprising means for selectively switching between image data stored in the image memory and image data supplied via the means for communication with the recording medium and for sending the selected image data to the image signal generating means.

14. The apparatus as set forth in claim 13, wherein the means for selectively switching between image data read from the image memory and the image data supplied via the means for communication with the recording medium, is adapted to change, when the recording medium is connected to the means for communication with the recording medium, image data stored in the image memory to image data supplied via the means for communication with the recording medium and to send the selected image data to the image signal generating means.

15. The apparatus as set forth in claim 6, further comprising:

means for detecting an amount of light around the apparatus; and means for adjusting an operation of the image displaying means based on a detection signal from the light detecting means.

16. The apparatus as set forth in claim 6, further comprising:

recognizing means for recognizing a human body or an object near the apparatus; and means for controlling power supply to the apparatus based on a detection signal from the recognizing means.

17. The apparatus as set forth in claim 6, further comprising display mode selecting means for selecting one of a plurality of image displaying modes.

18. The apparatus as set forth in claim 17, wherein the image signal generating means generates an image for each of a plurality of menu items indicating the plurality of image displaying modes, and one of the plurality of menu items is selected by the display mode selecting means.

* * * * *

(12) INTER PARTES REVIEW CERTIFICATE (15th)
United States Patent
Oba et al.

(10) Number: US 6,441,828 K1
(45) Certificate Issued: Jul. 14, 2014

(54) IMAGE DISPLAY APPARATUS

(75) Inventors: Haruo Oba; Kunihito Sawai; Yoshiaki Inque; Iwami Tsujimura

(73) Assignee: MobileMedia Ideas LLC

Trial Number:

IPR2013-00016 filed Oct. 12, 2012

Petitioner: Blackberry Corporation; Blackberry Limited

Patent Owner: MobileMedia Ideas LLC

Inter Partes Review Certificate for:

Patent No.: 6,441,828
Issued: Aug. 27, 2002
Appl. No.: 09/391,941
Filed: Sep. 8, 1999

The results of IPR2013-00016 are reflected in this inter partes review certificate under 35 U.S.C. 318(b).

INTER PARTES REVIEW CERTIFICATE
U.S. Patent 6,441,828 K1
Trial No. IPR2013-00016
Certificate Issued Jul. 14, 2014

AS A RESULT OF THE INTER PARTES REVIEW PROCEEDING, IT HAS BEEN DETERMINED THAT:

Claims 6, 7, 15, 17 and 18 are cancelled.

\* \* \* \* \*